United States Patent
Hyodo et al.

(10) Patent No.: US 8,736,804 B2
(45) Date of Patent: May 27, 2014

(54) LIQUID CRYSTAL DISPLAY DEVICE COMPRISING A CONCAVO-CONVEX PEDESTAL FORMED WITH A CONVEX PORTION AND A CONCAVE PORTION AT A BOTTOM OF THE CONCAVO-CONVEX PEDESTAL

(75) Inventors: Yosuke Hyodo, Chiba (JP); Koichi Igeta, Chiba (JP); Toshiki Kaneko, Chiba (JP); Noboru Kunimatsu, Chiba (JP); Hidehiro Sonoda, Mobara (JP)

(73) Assignee: Japan Display Inc., Tokyo (JP)

( * ) Notice: Subject to any disclaimer, the term of this patent is extended or adjusted under 35 U.S.C. 154(b) by 138 days.

(21) Appl. No.: 13/489,478

(22) Filed: Jun. 6, 2012

(65) Prior Publication Data

US 2012/0314177 A1   Dec. 13, 2012

(30) Foreign Application Priority Data

Jun. 9, 2011   (JP) .................................. 2011-128815

(51) Int. Cl.
*G02F 1/1339*   (2006.01)
*G02F 1/1337*   (2006.01)

(52) U.S. Cl.
USPC .......................................... 349/155; 349/125

(58) Field of Classification Search
USPC .................... 349/123–136, 155–157
See application file for complete search history.

(56) References Cited

U.S. PATENT DOCUMENTS

| 7,502,090 B2 | 3/2009 | Oh et al. |
| 2009/0059155 A1 | 3/2009 | Nakayama et al. |
| 2011/0013131 A1* | 1/2011 | Tanaka et al. .................. 349/155 |
| 2011/0080548 A1 | 4/2011 | Sonoda et al. |

FOREIGN PATENT DOCUMENTS

| JP | 5-107545 | 4/1993 |
| JP | 2005-242297 | 9/2005 |
| JP | 2007-328247 | 12/2007 |
| JP | 2008-170690 | 7/2008 |
| JP | 2009-58618 | 3/2009 |
| JP | 2009-282262 | 12/2009 |
| JP | 2010-8616 | 1/2010 |

* cited by examiner

*Primary Examiner* — Paul Lee
(74) *Attorney, Agent, or Firm* — Antonelli, Terry, Stout & Kraus, LLP.

(57) ABSTRACT

A liquid crystal display device includes a TFT substrate having an organic passivation film, and a counter substrate, with liquid crystals inside of the liquid crystal display device. A columnar spacer is formed on the counter substrate, which defines a distance between the TFT substrate and the counter substrate, and a concavo-convex pedestal is formed in a pixel region of the TFT substrate, the concavo-convex pedestal being provided in facing relation to the columnar spacer. The concavo-convex pedestal is formed with a convex portion and a concave portion at a bottom of the concavo-convex pedestal, with a top end of the columnar spacer being in contact with two or more convex portions formed on the bottom of the concavo-convex pedestal, and an area at the bottom of the concavo-convex pedestal being larger than the area at the top end of the columnar spacer.

8 Claims, 3 Drawing Sheets

LIQUID CRYSTAL DISPLAY DEVICE COMPRISING A CONCAVO-CONVEX PEDESTAL FORMED WITH A CONVEX PORTION AND A CONCAVE PORTION AT A BOTTOM OF THE CONCAVO-CONVEX PEDESTAL

CLAIM OF PRIORITY

The present application claims priority from Japanese Patent Application JP 2011-128815 filed on Jun. 9, 2011, the content of which is hereby incorporated by reference into this application.

BACKGROUND OF THE INVENTION

1. Field of the Invention

The present invention relates to a liquid crystal display device. The invention more particularly relates to a liquid crystal display device configured to take a countermeasure against light spots attributable to shavings of an alignment film.

2. Description of the Related Art

Liquid crystal display devices include a TFT substrate having pixel electrodes, thin film transistors (TFT), etc. formed in a matrix; a counter substrate disposed in facing relation to the TFT substrate and having color filters, etc. formed at positions corresponding to the pixel electrodes of the TFT substrate; and liquid crystals put between the TFT substrate and the counter substrate. Images are formed by controlling the light transmittance of liquid crystal molecules of each pixel.

In a liquid crystal display device, an alignment film is formed at the boundary surface of the counter substrate and a liquid crystal layer of the TFT substrate and liquid crystal molecules are subjected to initial alignment by applying a rubbing process or an optical alignment process to the alignment film. Then, an amount of light transmitted through the liquid crystal layer is controlled by twisting or rotating the liquid crystal molecules from the initial alignment by an electric field.

On the other hand, for controlling the thickness of the liquid crystal layer, it is necessary to form a spacer between the counter substrate and the TFT substrate. While beads, etc. were conventionally dispersed as a spacer in the liquid crystal layer, columnar spacers have been formed on the counter substrate to control a gap between the TFT substrate and the counter substrate by the columnar spacers in recent years in order to control the gap (liquid crystal layer) more exactly.

On the other hand, an additional problem occurs by using the columnar spacer. For example, JP-A-2005-242297 describes that a frictional force is decreased when the columnar spacer is displaced in a case of pressing the counter substrate from the outside so that the columnar spacer can easily return to the initial place when the external pressure is removed. For this purpose, JP-A-2005-242297 discloses that a pedestal having an area smaller than that at the top end of the columnar spacer is formed as a pedestal which is formed on the TFT substrate.

Further, a problem of generating shavings of the alignment film also occurs when the columnar spacer displaces laterally. Other documents concerning scraping of the alignment film or columnar spacers include JP-A-2007-328247, JP-A-2008-170690, JP-A-2009-58618, JP-A-2009-282262, JP-A-2010-8616, and JP-A-Hei 5-107545. It is to be noted that JP-A-2005-242297 corresponds to U.S. Pat. No. 7,502,090, JP-A-2009-58618 corresponds to USP 2009/0059155, and JP-A-2009-282262 corresponds to USP 2011/0080548.

SUMMARY OF THE INVENTION

Generally, the columnar spacers are disposed to the counter substrate. On the other hand, the pedestals are disposed to the TFT substrate at positions provided in facing relation to the columnar spacers. The pedestal means herein not only those having a protruding portion formed on the side of the TFT substrate but also those planarized or concaved at a portion provided in facing relation to the columnar spacer. That is, the pedestal means herein the structure on the side of the TFT substrate provided in facing relation to the columnar spacer.

In the liquid crystal display device, an alignment film is formed on the surface of the counter substrate and the TFT substrate in contact with the liquid crystal layer. Since the columnar spacer has a relatively large height, the alignment film is less formed at the top end of the columnar spacer in the counter substrate. On the other hand, since the height of the pedestal of the TFT substrate is lower than that of the columnar spacer, the alignment film is formed also on the surface of the pedestal. When the columnar spacer is in contact with the surface of the pedestal on which the alignment film is formed, the alignment film at the surface of the pedestal is scraped off.

That is, when the liquid crystal display device undergoes temperature cycles, etc. and the TFT substrate and the counter substrate expand or shrink at different ratios or when the counter substrate undergoes a pressure from the outside, the columnar spacer displaces laterally. At this time, the alignment film on the pedestal is scraped off. When scraped off shavings of the alignment film intrude into the liquid crystal layer, light spots are generated to degrade the image quality.

The present invention intends to suppress the generation of the light spots by providing a countermeasure for the scraped off shavings of the alignment film caused by the columnar spacer.

The present invention intends to overcome the problem described above and provides a liquid crystal display device comprising:

a TFT substrate having an organic passivation film;

a counter substrate, the counter substrate being adhered to the TFT substrate by a sealant formed at a periphery thereof;

liquid crystals put inside of the liquid crystal display device;

a columnar spacer formed on the counter substrate, the columnar spacer defining a distance between the TFT substrate and the counter substrate; and a concavo-convex pedestal formed in a pixel region of the TFT substrate, the concavo-convex pedestal being provided in facing relation to the columnar spacer;

wherein the concavo-convex pedestal is formed with a convex portion and a concave portion at a bottom of the concavo-convex pedestal, and the height of the top end of the convex portion is lower than that of the planar portion, wherein the thickness of the alignment film present on the convex portion is smaller than the thickness of the alignment film present on the concave portion, wherein the top end of the columnar spacer is in contact with two or more convex portions formed on the bottom of the concavo-convex pedestal, and wherein the area at the bottom of the concavo-convex pedestal is larger than the area at the top end of the columnar spacer.

According to the invention, in the liquid crystal display device having the columnar spacer and using the optical alignment film, since scraping of the alignment film caused by the columnar spacer can be prevented, production yield of the liquid crystal display device can be improved. Further, since scraping of the alignment film, which is caused by the lateral displacement of the columnar spacer attributable to the temperature cycles after shipping or the pressure from the outside to the counter substrate, can be prevented, generation of failure in the market can be prevented.

In a liquid crystal display device of a liquid crystal injection type using a dropping method, the number of columnar spacers is small and a stress between the columnar spacer and the pedestal per one set is large. According to the invention, since the alignment film is not present or the film thickness is smaller than that in other portions in the pedestal in contact with the columnar spacer, generation of the scraping of alignment film can be prevented. Thus, generation of light spots can be prevented.

DESCRIPTION OF THE PREFERRED EMBODIMENTS

Figure 1:
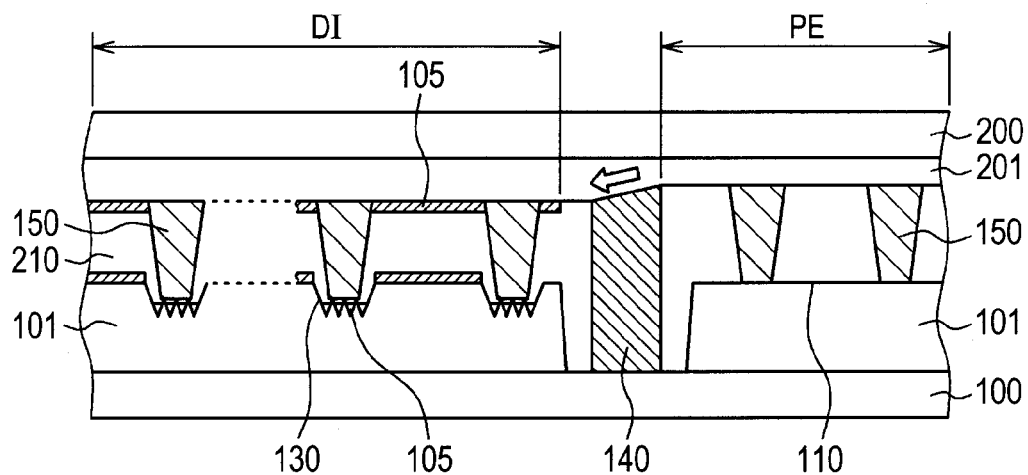
FIG. 1 is a cross sectional view of a liquid crystal display device of the invention.
Figure 2:
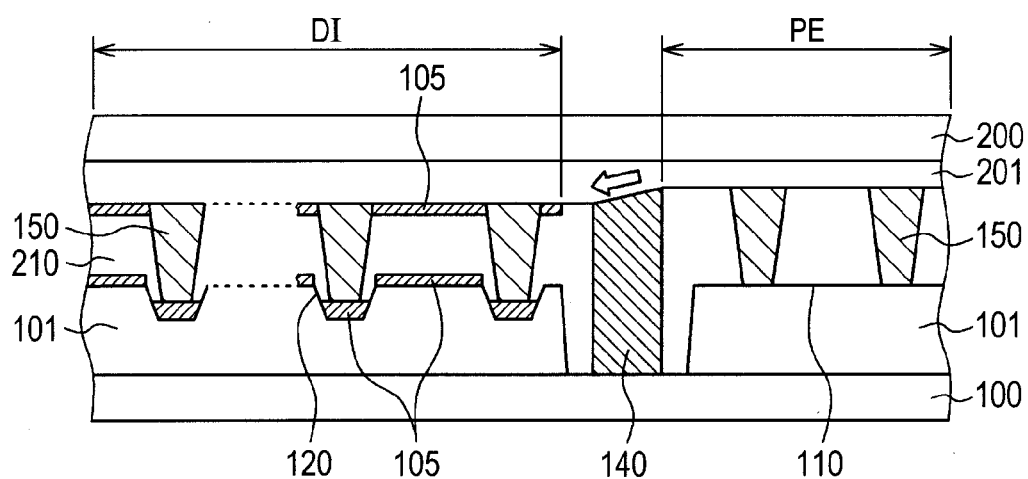
FIG. 2 is a cross sectional view of a liquid crystal display device of a comparative embodiment to the invention.

FIG. 1 is a cross sectional view of a liquid crystal display device according to the invention. FIG. 2 is a schematic cross sectional view of a liquid crystal display device as a comparative embodiment. First description is to be made with reference to FIG. 2.

In FIG. 2, an organic passivation film 101 is formed over a TFT substrate 100. Since the organic passivation layer 101 also has a function as a planarizing film, it is formed to a large thickness of about 1.5 to 2 μm. In FIG. 2, while interconnects, electrodes, semiconductor films, a gate insulating film, an inorganic passivation film, etc. are formed actually between the TFT substrate 100 formed of glass and the organic passivation film 101, the layers are not illustrated since FIG. 2 is a schematic view.

The organic passivation film 101 per se is formed of a photosensitive resin and can be patterned without using a photoresist. A hole or a concave portion is formed on the organic passivation film 101 by using exposure or half exposure. The organic passivation film 101 is removed from a portion of forming a sealant 140 for bonding the TFT substrate 100 and the counter substrate 200. Further, a concave pedestal 120 is formed on the TFT substrate 100 at a portion provided in facing relation to the columnar spacer 150 formed on the counter substrate 200. The concave pedestal 120 is concaved at a portion of the TFT substrate 100 in contact with the columnar spacer 150 and is lowered compared with other portions.

Figure 3:
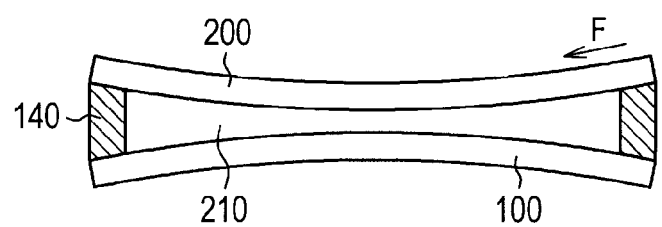
FIG. 3 is a cross sectional view of a liquid crystal display device showing a state where a TFT substrate and a counter substrate are deformed inwardly into a convex shape.

The concave pedestal 120 is formed as described above in order to keep the TFT substrate 100 or the counter substrate 200 to an inwardly convexed shape in a usual state. For example, in the structure as shown in FIG. 3, when temperature increases and the TFT substrate 100 or the counter substrate 200 expands thermally, the stress caused by the thermal expansion exerts in the direction as shown by F in FIG. 3 and this is not a direction of causing a gap between the TFT substrate 100 and the counter substrate 200. Accordingly, even when the TFT substrate 100 or the counter substrate 200 thermally expands, bubbles are not generated in the liquid crystal layer.

Referring again to FIG. 2, since the concave pedestal 120 is formed in a pixel region DI in the inside of the sealant 140 in FIG. 2 and the planar pedestal 110 is formed at the outside PE of the sealant 140, the gap between the TFT substrate 100 and the counter substrate 200 is decreased in the pixel region DI and the liquid crystal display device has a shape as shown in FIG. 3.

While a counter electrode, an interlayer insulating film, a pixel electrode, etc. are formed usually over the organic passivation film 101 of the TFT substrate 100, since FIG. 2 is a schematic view, the layers are not illustrated. Accordingly, in FIG. 2, the alignment film 105 is formed over the organic passivation film 101. Since the alignment film 105 is liquid at the instance it is coated, it accumulates at a large thickness in the lower portion by the leveling effect.

That is, the alignment film 105 is formed at a relatively large thickness also on the concave pedestal 120 shown in FIG. 2. The alignment film 105 is not coated to a portion where the sealant 140 is formed. Since the adhesion between the sealant 140 and the substrate is lowered when the alignment film 105 is present at the sealant 140, deposition of the alignment film 105 to the sealant 140 is prevented by using a stopper or the like.

In FIG. 2, an overcoat film 201 is formed on the side of the counter substrate 200, and the columnar spacer 150 is formed over the overcoat film 201. While color filters and black matrixes are generally formed between the overcoat film 201 and the counter substrate 200, since FIG. 2 is a schematic view, they are not illustrated. The alignment film 105 is formed over the overcoat film 201. In FIG. 2, the alignment film 105 is not formed at the top end of the columnar spacer 150. This is because the columnar spacer 150 has a relatively large height and the alignment film 105, which is liquid during coating, is less deposited at the top end. Also on the side of the counter substrate 200, the alignment film 105 is not formed on the sealant 140 by the same reason as that for the TFT substrate 100.

In FIG. 2, while the columnar spacer 150 of the counter substrate is disposed in facing relation to the portion of the concave pedestal 120 of the TFT substrate 100, the alignment film 105 is present on the concave pedestal 120. Therefore, when the columnar spacer 150 causes lateral displacement, etc., the alignment film 105 is scraped off to generate scraped off shavings of the alignment film and cause light spots. In the invention shown by the following embodiments, scraping of the alignment film 105 can be prevented in the liquid crystal display device having the concave pedestal 120 in the pixel region DI.

[Embodiment 1]

FIG. 1 is a cross sectional view of a liquid crystal display device according to the invention. The basic configuration of FIG. 1 is identical with that in FIG. 2. That is, a concave pedestal is formed on the organic passivation film 101 in the pixel region so that the TFT substrate 100 and the counter substrate 200 are convexed inward as shown in FIG. 3 to make the gap between the TFT substrate 100 and the counter substrate 200 smaller in the pixel portion than in the periphery.

FIG. 1 is different from FIG. 2 in that a concavo-convex portion is formed at the bottom of the concave pedestal for preventing scraping of the alignment film by the columnar spacer 150. The pedestal in FIG. 1 is hereinafter referred to as a concavo-convex pedestal 130. That is, in the concavo-convex pedestal 130, the concavo-convex portion is formed at the bottom of the concave pedestal 120 formed on the organic passivation film 101.

In FIG. 1, while a convex portion 131 and a concave portion 132 are formed at the bottom of the concavo-convex pedestal 130, the columnar spacer 150 formed on the counter substrate 200 is in contact only with the convex portion (corresponding to the portion 131 in FIG. 4 to be described later) of the concavo-convex pedestal 130.

In order to make the cross sectional shape of the liquid crystal display device into the shape as shown in FIG. 3, the height of the convex portion 131 at the bottom of the concavo-convex pedestal 130 is lower than the height of the planar pedestal 110 at the outside of the sealant 140. Alternatively, the height of the convex portion 131 at the bottom of the concavo-convex pedestal 130 is lower than that of the planar portion between adjacent concavo-convex pedestals 130 and 130.

The alignment film 105 is not present on the convex portion 131 due to the leveling effect or, even if it is present, the thickness is made extremely smaller than that of the concave pedestal portion in FIG. 2. Accordingly, even when lateral displacement is caused to the columnar spacer 150, the alignment film 105 is not scraped off. On the other hand, while the alignment film 105 is present on the concave portion 132 of the concavo-convex pedestal 130, the columnar spacer 150 is not in contact with the concave portion 132 of the concavo-convex pedestal 130 in the configuration of the present invention.

Figure 4:
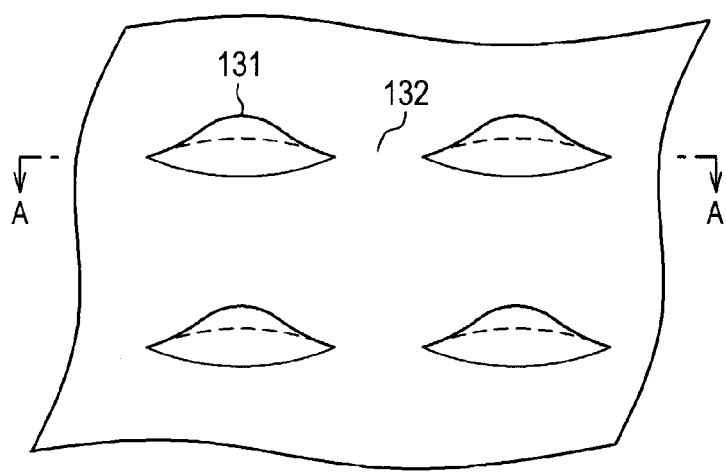
FIG. 4 is a perspective view showing an example of a convex portion formed at the bottom of a concavo-convex pedestal.

FIG. 4 is a schematic view for the shape of the bottom of the concavo-convex pedestal 130, which is a perspective view of the convex portion 131 as a protrusion having a circular bottom. The concave portion 132 is present between adjacent convex portions 131 and 131. While more convex portions 131 are usually formed at the bottom of the concavo-convex pedestal 130, FIG. 4 shows a portion of the bottom.

Figure 5:
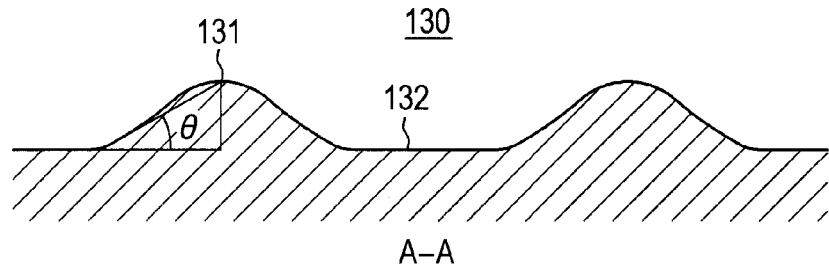
FIG. 5 is a schematic cross sectional view for defining the angle of inclination of the convex portion formed at the bottom of the concavo-convex pedestal.

FIG. 5 is a cross sectional view along line A-A in FIG. 4 which shows the definition for the angle of inclination θ of the convex portion 131 formed at the bottom of the concavo-convex pedestal 130. In FIG. 5, the angle of inclination θ means an angle between the planar concave portion 132 and a line connecting the apex of the concave portion 131 and a beginning portion of a planar concave portion 132. When it is uncertain whether the concave portion 132 is planar or not, a line connecting two concave portions 132 on the both sides of the convex portion 131 may be defined as a flat line.

The convex portion 131 is formed by using half exposure. That is, the concavo-convex portion is formed at the bottom of the concavo-convex pedestal 130 by decreasing the exposure amount for the convex portion 131 and increasing the exposure amount for the concave portion 132. In such a forming method, it is difficult to form a large angle of inclination θ as shown in FIG. 5. On the other hand, when θ is excessively small, it is difficult to form sufficient concavo-convex portion in order not to form the alignment film 105 on the concave portion 131.

As the condition for the angle in order not to form the alignment film 105 to the convex portion by the process for forming the concavo-convex portion and due to the leveling effect of the concavo-convex portion, θ is desirably 3 degrees or more and 45 degrees or less in FIG. 5 according to the experiment.

When θ is smaller than 3 degrees, the effect of decreasing the thickness of the alignment film 105 on the concave portion 131 was not obtained. As the effect of the invention, a predetermined effect can be obtained not only in the case where the alignment film 105 is eliminated completely at the convex portion 131 but also in the case where the thickness of the alignment film 105 at the concave portion 131 is decreased to less than that in the concave portion. The value for the θ is more preferably 6 degrees or more and 25 degrees or less.

Figure 6:
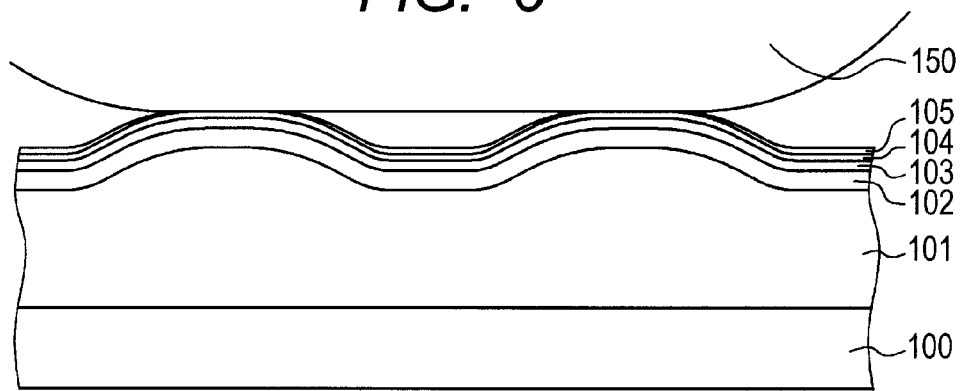
FIG. 6 is a cross sectional view showing a state where the convex portion formed at the bottom of the concavo-convex pedestal and the columnar spacer are in contact to each other.

FIG. 6 is a cross sectional view showing the state where the columnar spacer 150 is in contact with the concavo-convex pedestal 130 at the bottom of the concavo-convex pedestal. In the TFT substrate 100 in FIG. 6, layers below the organic passivation film 101 are not illustrated. The organic passivation film 101 is formed at a thickness of 1.5 μm. The concavo-convex portion is formed on the organic passivation film 101 and an interlayer insulating film 102 formed of SiN is formed over the organic passivation film 101.

A metal layer 103 inherent to the pedestal portion is formed of a metal over the interlayer insulating film 102. The metal layer 103 is formed of MoCr. It is to be noted that the metal layer 103 is disposed for adjusting the height of the portion in contact with the columnar spacer 150, which is not essential depending on the place. An ITO (Indium-Tin-Oxide) film 104 is formed on a thickness of 77 μm over the metal layer 103 by sputtering. The ITO film 104 is formed simultaneously with sputtering for the pixel electrode. While the alignment film 105 is formed over the ITO film 104, the alignment film 105 is deposited such that the thickness is 80 μm for the planar portion between adjacent concavo-convex pedestals 130 and 130 in FIG. 1.

In this case, at the bottom of the concavo-convex pedestal 130 shown in FIG. 6, the alignment film 105 is not present on the convex portion 131 and the alignment film 105 is present only on the concave portion 132. As shown in FIG. 6, the top end of the columnar spacer 150 is in contact only with the convex portions 131 at the bottom of the concavo-convex pedestal 130. Since the alignment film 105 is not present on the convex portions 131 in contact with the columnar spacer 150, if the columnar spacer 150 should cause lateral displacement, etc., the alignment film 105 is not scraped off.

What is important in FIG. 6 is that the top end of the columnar spacer 150 is in contact with at least two convex portions 131 formed at the bottom of the concavo-convex pedestal 130. If the top end of the columnar spacer 150 is in contact only with one convex portion 131, since the columnar spacer 150 is tilted and a portion thereof is in contact with the concave portion 132 where the alignment film 105 is formed at a large thickness, the alignment film 105 tends to be scraped off.

In FIG. 6, while the top end of the columnar spacer 150 is in contact with two convex portions 131, it is more preferably in contact with three or more convex portions 131. This is because the columnar spacer 150 can be in contact only with the convex portions 131 more stably. The alignment film 105 is not present at the top end of the convex portion 131 in FIG. 6. However, the undesired effect of scraping of the alignment film can be mitigated also in a case where the alignment film 105 is not eliminated completely but formed at a small thickness.

Figure 7:
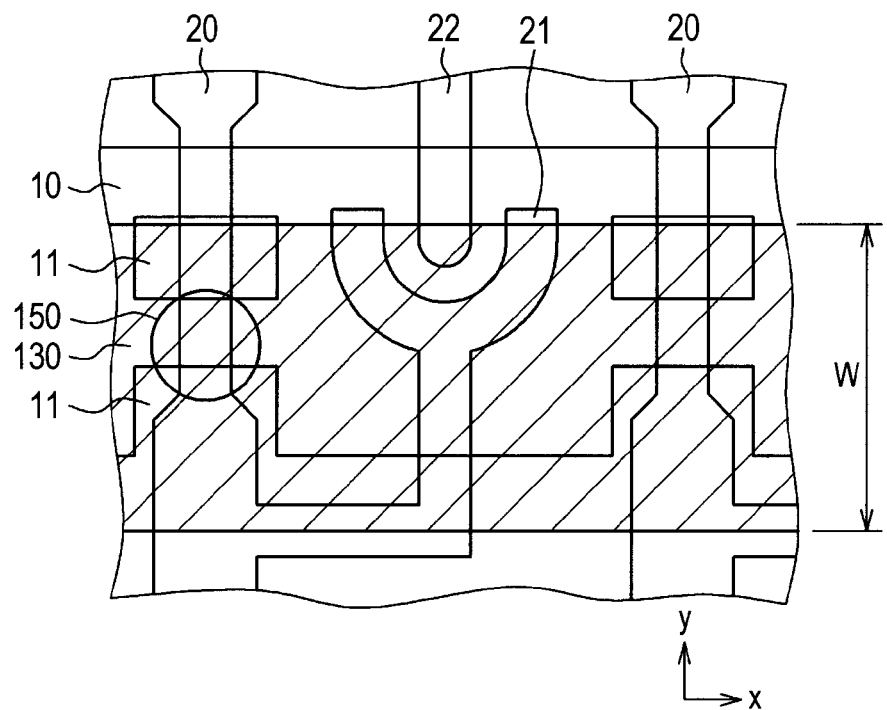
FIG. 7 is a plan view showing a region where the concavo-convex pedestal is formed.

FIG. 7 is a plan view showing an example of a place where the concavo-convex pedestal 130 is formed. In FIG. 7, video signal lines 20 are extended in a vertical direction (y direction) and are arranged in the lateral direction (x direction). Scanning lines 10 are extended in the lateral direction and arranged at a predetermined pitch in the vertical direction (y direction). The scanning line 10 is used also as a gate electrode of the TFT and is formed in a large width. However, for decreasing the capacitance between the scanning line 10 and the video signal line 20, a recess 11 is formed at a region intersecting the video signal line 20 so as to decrease the area.

The drain electrode 21 of the TFT is coupled to the video signal line 20 and formed in a horseshoe shape at a portion provided in facing relation to the source electrode 22 so as to surround one side of the source electrode 22. The source electrode 22 is coupled to a pixel electrode not shown. A semiconductor layer not shown is formed below the drain electrode 21 and the source electrode 22.

In FIG. 7, the concavo-convex pedestal 130 is extended with a predetermined width W in the lateral direction. In FIG. 7, while only one concavo-convex pedestal 130 in a lateral stripe shape is formed in the lateral direction, it is arranged actually at a predetermined pitch in the vertical direction. The bottom of the concavo-convex pedestal 130 is lower than the planarized portion where the concavo-convex pedestal 130 is not formed. Further, a convex portion 131 and a concave portion 132 which are not shown are formed at the bottom of the concavo-convex pedestal 130.

In FIG. 7, the columnar spacer 150 is disposed at the intersection between the video signal line 20 and the scanning line 10. In FIG. 7, the area of the concavo-convex pedestal 130 is larger than the area at the top end of the columnar spacer 150. Accordingly, even when the columnar spacer 150 should displace laterally, the columnar spacer 150 can move only over the convex portion 131 of the concavo-convex pedestal 130.

In FIG. 7, the convex portion 131 of the concavo-convex pedestal 130 may be formed over the entire surface of the bottom of the concavo-convex pedestal 130 or may be formed only at a portion of the area where the columnar spacer 150 may possibly displaces laterally. Since the concavo-convex portion at the bottom of the concavo-convex pedestal 130 is formed by half exposure, formation of the concavo-convex portion has no significant difference in view of the process whether it is formed over the entire surface or only at a portion of the bottom of the concavo-convex pedestal 130.

In FIG. 7, the pedestal 130 is extended continuously in the lateral direction in a width W but it may be formed in an island shape only at the periphery of the columnar spacer 150. However, the continuous concavo-convex pedestal 130 as shown in FIG. 7 can ensure the degree of freedom for the arrangement of the columnar spacer 150 if this may be permitted in view of the structure.

[Embodiment 2]

Figure 8:
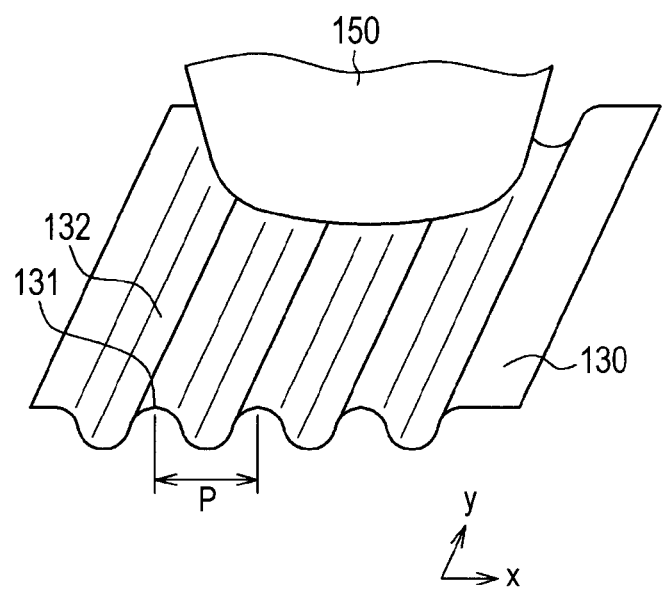
FIG. 8 is a perspective view showing a shape at the bottom of the concavo-convex pedestal according to an Embodiment 2.

FIG. 8 is a perspective view showing the shape of the bottom of the concavo-convex pedestal 130 according to a second embodiment of the invention. In FIG. 8, a concavo-convex portion at the bottom of the concavo-convex pedestal 130 is formed only in one direction (x direction).

That is, in FIG. 8, concavo-convex portions are formed continuously at a predetermined pitch P in the lateral direction (x direction) and ridges of the convex portions 131 are formed in the vertical direction (y direction). Also in the shape of FIG. 8, the alignment film 105 is not present on the convex portion 131, and the alignment film 105 is formed at a large thickness in the concave portion 132.

In FIG. 8, while the columnar spacer 150 is in contact with the convex portions 131, since the alignment film 105 is not present on the convex portions 131, the alignment film 105 is not scraped off even when the columnar spacer 150 should displace laterally. For preventing the columnar spacer 150 from tilting and being in contact with the concave portion 132 where the alignment film 150 is formed at a large thickness, it is necessary that the columnar spacer 150 is in contact with at least two convex portions 131 in FIG. 8.

That is, in FIG. 8, it is necessary that the diameter at the top end of the columnar spacer 150 has such a width enough to be in contact with at least two convex portions 131 in the x direction. Preferably, the diameter at the top end of the columnar spacer 150 is such that the top end is in contact with three or more convex portions 131 in the x direction.

The angle of inclination θ in the cross sectional shape of the convex portion 131 in FIG. 8 is identical with the case of the convex portion 131 having the circular cross section. That is, the cross section in the x direction in FIG. 7 corresponds to the cross section of FIG. 5. That is, also in this embodiment, as the condition considering that the alignment film 105 is not formed on the convex portion 131 by the concavo-convex portion forming process and due to the leveling effect of the concavo-convex portion, θ in FIG. 5 is preferably 3 degrees or more and 45 degrees or less.

When θ is smaller than 3 degrees, the effect of decreasing the thickness of the alignment film 105 on the convex portion 131 could not be obtained. As the effect of the invention, a predetermined effect can be obtained not only in a case where the alignment film 105 is eliminated completely from the convex portion 131 but also in a case where the thickness of the alignment film 105 on the convex portion 131 is decreased to less than that on the concave portion 132. The value of θ is, more preferably, 6 degrees or more and 25 degrees or less.

In FIG. 8, the extending direction of the convex portion 131 at the bottom of the concavo-convex pedestal 130 or the extending direction of a ridge 131 is in the y direction, that is, the direction of the width W in FIG. 7. However, the extending direction of the ridge 131 in FIG. 8 is not restricted to the y direction but may also be in the x direction. In this case, laterally long ridges 131 are formed at the bottom of the concavo-convex pedestal 130 extending in the lateral direction shown in FIG. 7, and the ridges 131 are formed at a predetermined pitch in the vertical direction.

Further, the ridge 131 formed at the bottom of the concavo-convex pedestal 131 may have a predetermined angle not only in the x direction or the y direction but also in the x direction and the y direction. It is important that the top end of the columnar spacer 150 is in contact with two or more ridges 131, more preferably, in contact with three or more ridges 131 irrespective of the direction of the ridge 131. In this case, it is necessary that the top end of the columnar spacer 150 is in contact with two or more and, preferably, three or more ridges in the direction orthogonal to the extending direction of the ridge.

Incidentally, the method of injecting liquid crystals in the liquid crystal display device includes a method of injecting liquid crystals through an injection hole while evacuating the inside of the liquid crystal display device (vacuum injection method), and a method of forming a sealant at a periphery of the counter substrate and dropping the liquid crystals to the inside (dropping method: One Drop Fill (ODF)). Of the methods, it is necessary for the dropping method to accurately control the amount of the liquid crystals to be dropped. When a large number of the columnar spacers 150 are formed on the counter substrate 200, control for the dropping amount of liquid crystals is difficult, and control for the gap between the TFT substrate 100 and the counter substrate 200 is difficult due to variation of the size between the columnar spacers 150.

Accordingly, in the dropping method, the number of the columnar spacers 150 is smaller than that in the case of the vacuum injection method. Then, when the liquid crystal display device undergoes heat cycles, or a pressure applied from the outside, etc., the stress and strain exerting per one columnar spacer 150 are increased. That is, the amount of lateral displacement of the columnar spacer 150 is increased. That is, in the case of the dropping method, there is a higher possibility of causing scraping of the alignment film.

Accordingly, the effect can be improved particularly effectively when the invention is applied to a liquid crystal display device of a type in which the liquid crystal is injected by the dropping method.

What is claimed is:

1. A liquid crystal display device comprising:
   a TFT substrate having an organic passivation film;
   a counter substrate, the counter substrate being adhered to the TFT substrate by a sealant formed at a periphery thereof;
   liquid crystals put inside of the liquid crystal display device;
   a columnar spacer formed on the counter substrate, the columnar spacer defining a distance between the TFT substrate and the counter substrate; and
   a concavo-convex pedestal formed in a pixel region of the TFT substrate, the concavo-convex pedestal being provided in facing relation to the columnar spacer;
   wherein the concavo-convex pedestal is formed with a convex portion and a concave portion at a bottom of the concavo-convex pedestal, and a height of a top end of the convex portion is lower than that of a planar portion of an upper surface of the organic passivation film,
   wherein a thickness of an alignment film present on the convex portion is smaller than a thickness of an alignment film present on the concave portion,
   wherein a top end of the columnar spacer is in contact with two or more convex portions formed on the bottom of the concavo-convex pedestal, and
   wherein an area at the bottom of the concavo-convex pedestal is larger than an area at the top end of the columnar spacer.

2. The liquid crystal display device according to claim 1, wherein the top end of the columnar spacer is in contact with three or more convex portions formed at the bottom of the concavo-convex pedestal.

3. The liquid crystal display device according to claim 1, wherein an angle of inclination at an inclined portion in the cross sectional shape of the convex portion is 6 degrees or more and 25 degrees or less.

4. The liquid crystal display device according to claim 3, wherein the angle of inclination at the inclined portion in the cross sectional shape of the convex portion is 3 degrees or more and 45 degrees or less.

5. The liquid crystal display device according to claim 1, wherein the distance between the TFT substrate and the counter substrate is smaller in a central portion than at the periphery of the liquid crystal display device.

6. The liquid crystal display device according to claim 1, wherein the liquid crystals are filled by a dropping method.

7. A liquid crystal display device comprising:
   a TFT substrate having an organic passivation film;
   a counter substrate, the counter substrate being adhered to the TFT substrate by a sealant formed at a periphery thereof;
   liquid crystals put inside of the liquid crystal display device;
   a columnar spacer formed on the counter substrate, the columnar spacer defining a distance between the TFT substrate and the counter substrate; and
   a concavo-convex pedestal formed in a pixel region of the TFT substrate, the concavo-convex pedestal being provided in facing relation to the columnar spacer;
   wherein the concavo-convex pedestal is formed with ridges and a concave portion at a bottom of the concavo-convex pedestal, each of ridges being formed by a convex portion extending in a predetermined direction, the concave portion being formed between each set of the adjacent ridges,
   wherein a height of a top end of the ridge is lower than that of a planar portion of an upper surface of the organic passivation film,
   wherein a thickness of an alignment film present on the ridge is smaller than a thickness of an alignment film present on the concave portion,
   wherein a top end of the columnar spacer is in contact with two or more ridges formed at a bottom of the concavo-convex pedestal, and
   wherein an area at the bottom of the concavo-convex pedestal is larger than an area at the top end of the columnar spacer.

8. The liquid crystal display device according to claim 7, wherein the top end of the columnar spacer is in contact with three or more ridges formed at the bottom of the concavo-convex pedestal.

* * * * *